(12) United States Patent
Letay et al.

(10) Patent No.: US 8,701,386 B2
(45) Date of Patent: Apr. 22, 2014

(54) AIRCRAFT NACELLE THAT INCORPORATES A THRUST REVERSAL DEVICE

(75) Inventors: Benoit Letay, Bouloc (FR); Benjamin Saget, Toulouse (FR); Franck Lesieur, Toulouse (FR); Stephane Flin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 765 days.

(21) Appl. No.: 12/825,393

(22) Filed: Jun. 29, 2010

(65) Prior Publication Data

US 2011/0127353 A1    Jun. 2, 2011

(30) Foreign Application Priority Data

Jul. 8, 2009   (FR) .................................... 09 54735

(51) Int. Cl.
*F02K 3/02* (2006.01)
*F02K 1/54* (2006.01)
*B63H 11/10* (2006.01)

(52) U.S. Cl.
USPC .................. 60/226.2; 244/110 B; 239/265.19

(58) Field of Classification Search
USPC ................ 60/226.2; 244/110 B; 239/265.19, 239/265.25, 265.29, 265.37, 265.17, 265.31
See application file for complete search history.

(56) References Cited

U.S. PATENT DOCUMENTS

| 3,303,653 | A | * | 2/1967 | Hull, Jr. ........................... 60/229 |
| 3,475,913 | A | * | 11/1969 | Mortlock et al. ................ 60/229 |
| 3,598,318 | A | | 8/1971 | Schiel |
| 3,815,357 | A | * | 6/1974 | Brennan ........................ 60/226.2 |
| 3,831,376 | A | * | 8/1974 | Moorehead ................... 60/226.2 |
| 3,875,742 | A | | 4/1975 | McMurtry et al. |
| 4,073,440 | A | | 2/1978 | Hapke |
| 4,501,393 | A | * | 2/1985 | Klees et al. .............. 239/265.13 |
| 5,699,966 | A | * | 12/1997 | Beverage ................. 239/265.19 |
| 7,681,399 | B2 | * | 3/2010 | Orlando et al. .................. 60/770 |
| 8,272,202 | B2 | * | 9/2012 | Pero ................................... 60/204 |
| 2011/0127353 | A1 | * | 6/2011 | Letay et al. .............. 239/265.37 |

FOREIGN PATENT DOCUMENTS

FR    2177006 A1    11/1973

OTHER PUBLICATIONS

French Search Report in Corresponding Application No. FR0954735 dated Feb. 11, 2010.

\* cited by examiner

*Primary Examiner* — Gerald L Sung

(74) *Attorney, Agent, or Firm* — Young & Thompson

(57) ABSTRACT

An aircraft nacelle in which a power plant with an outside surface is arranged, whereby the nacelle has an inside wall that with the outside surface of the power plant delimits a secondary annular pipe, at least one moving part so as to create at least one lateral opening, and a thrust reversal device that has at least one moving physical obstacle that can occupy a first retracted state in which it does not deflect the stream that circulates in the secondary pipe and another deployed state in which it at least partially deflects the stream that circulates in the secondary annular pipe toward the at least one side opening, characterized in that it includes a ring that is arranged in the secondary pipe, distant from the inside wall of the nacelle and the outside surface of the power plant that supports the at least one moving physical obstacle.

17 Claims, 5 Drawing Sheets

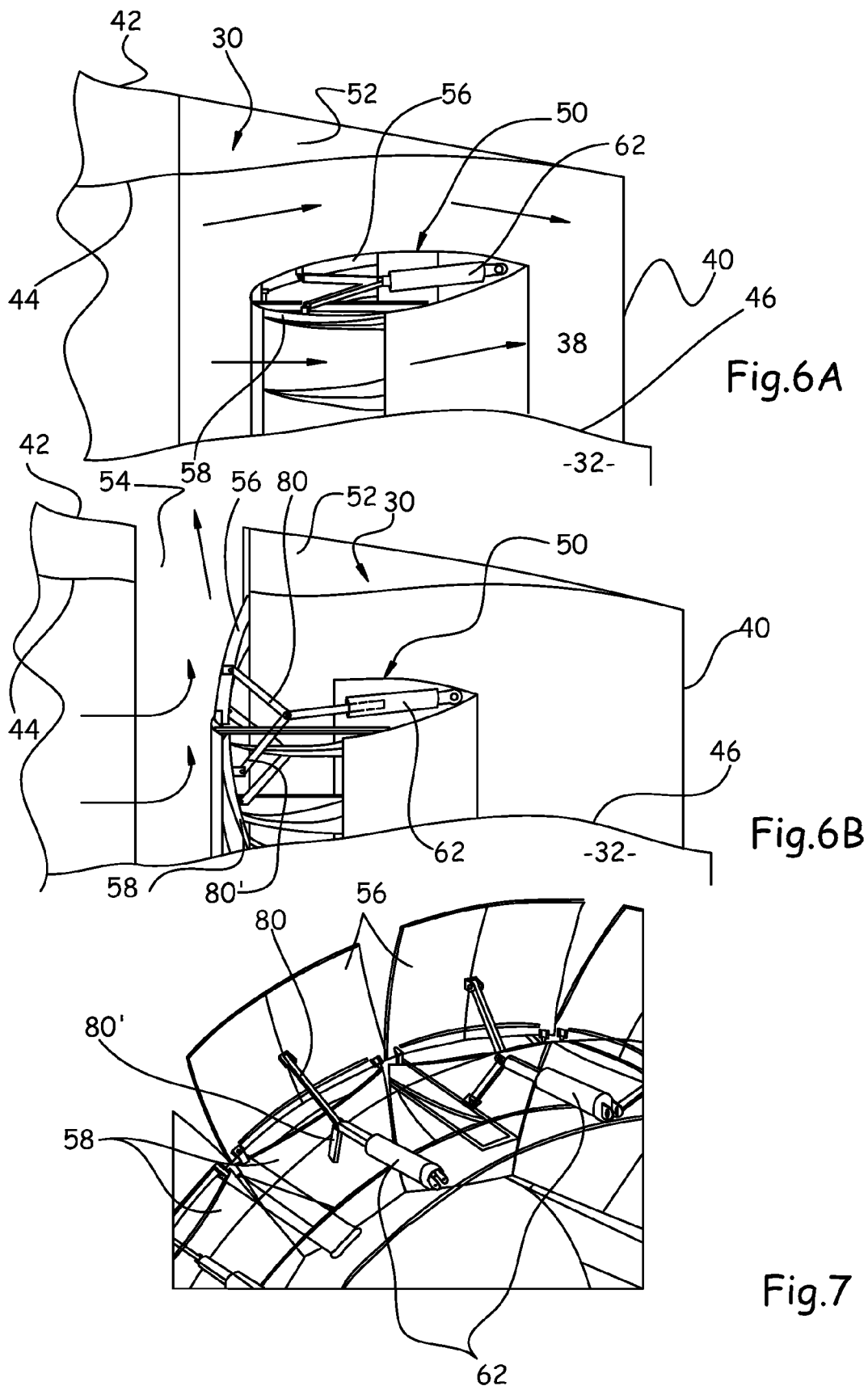

AIRCRAFT NACELLE THAT INCORPORATES A THRUST REVERSAL DEVICE

This invention relates to an aircraft nacelle that incorporates a device for reducing, canceling, or reversing the thrust that is produced by the power plant of the aircraft.

Figure 1:
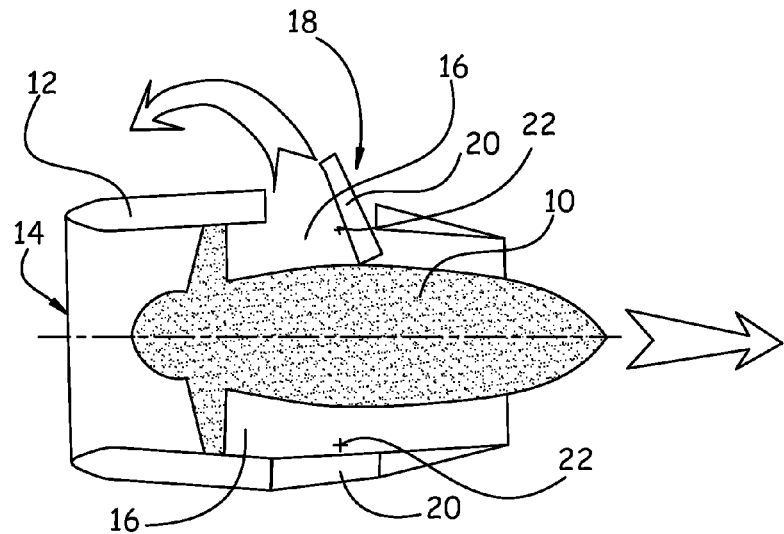
Figure 2A:
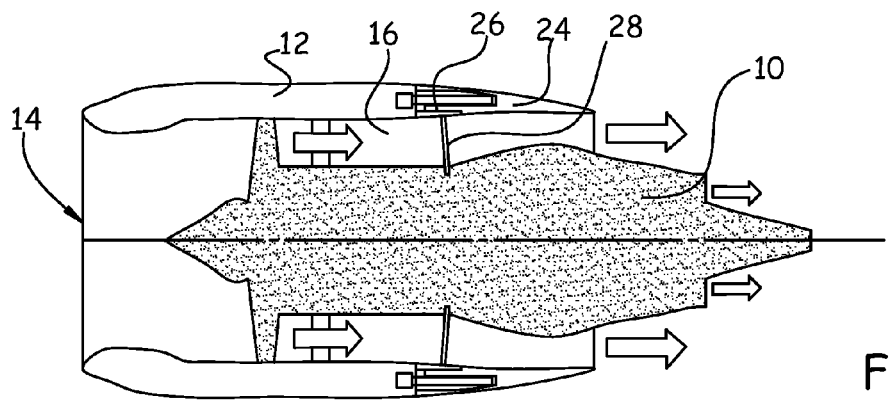
Figure 2B:
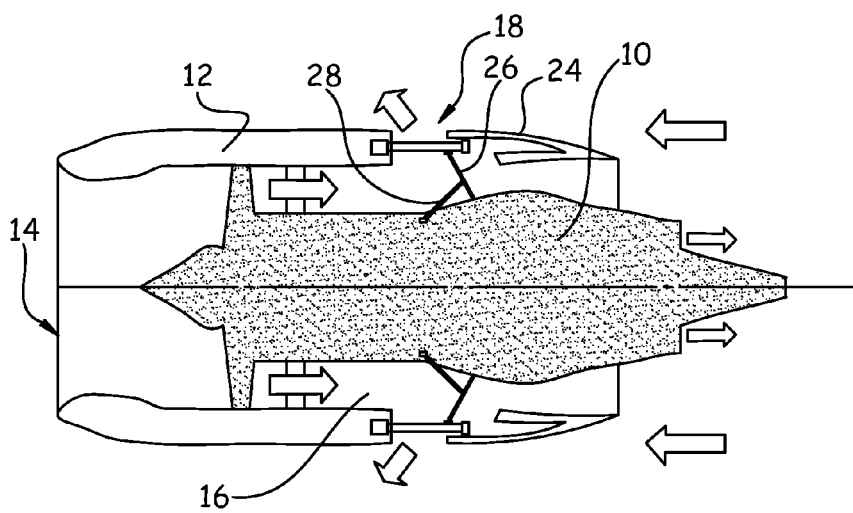

As illustrated in FIGS. 1, 2A and 2B, an aircraft propulsion unit comprises an engine 10 with, on the one hand, a fan that comprises a rotor that is equipped with blades and a stator that is equipped with vanes, and, on the other hand, a primary pipe in which compressor stages, a combustion chamber, and turbine stages are arranged in the direction of flow of the air. The engine is arranged in a nacelle 12 that comprises an air intake 14 upstream from the fan and a secondary pipe 16 downstream from the stator of the fan.

In a general manner, the nacelle 12 comprises two junctions (not shown) that connect the nacelle and the power plant, arranged in the secondary pipe according to angular positions that are respectively greater than 12 o'clock and less than 6 o'clock. These two junctions constitute aerodynamic fairings with structural elements and with systems of the propulsion unit that connect the primary pipe to the rest of the nacelle. When the power plant is provided under the wing, the mast attaching the propulsion unit to the wing is partly arranged in the upper junction to connect the primary pipe to the rest of the propulsion unit.

So as to reduce the noise pollution, certain parts of the secondary pipe surfaces 16 comprise coatings for the acoustic treatment.

A propulsion unit generally comprises a thrust reversal device 18 that makes it possible to deflect at least a portion of the stream so as to reduce, cancel or reverse the thrust that is produced by said propulsion unit using one or more moving physical obstacles.

According to a first so-called variant with a pivoting door illustrated in FIG. 1, the nacelle 12 comprises at least one moving part 20 that is called a door that can pivot relative to an axis 22 so as to generate a radial opening after pivoting, whereby said door comprises a part that projects into the secondary pipe 16 so as to form an obstacle that can deflect at least a portion of the stream that flows into said secondary pipe in the direction of the radial opening.

According to another so-called cascade variant that is illustrated in FIGS. 2A and 2B, the nacelle 12 comprises at least one moving part 24 that can move translationally toward the rear so as to provide—between the stationary parts of the nacelle and said at least one moving part 24—at least one radial opening as well as flaps 26 that are articulated relative to the moving part, able to occupy a first deployed position in which they at least partially seal the secondary pipe 16 so as to deflect the air flow in the direction of the radial opening and a second retracted position, flattened against the surface of the secondary pipe of the nacelle. Connecting rods 28 are generally provided to maneuver the flaps 26, whereby one of the ends of the rods 28 is connected to a flap 26 and the other to the power plant 10.

The pivoting-door- or cascade-type thrust reversers limit the inside surface of the nacelle that can comprise a coating for the acoustic treatment. Actually, the connecting zones between the stationary parts and the moving parts, the zones at which the joints of the pivoting elements (doors or flaps) are provided, cannot comprise a coating for the acoustic treatment. In the case of a cascade reverser, the untreated surfaces can represent on the order of 20% of the inside surface of the nacelle.

In addition, the moving parts have large dimensions, taking into account the fact that they should extend from the inside surface of the nacelle up to the outside surface of the power plant. However, to the extent that the dilution rate of the new generations of engines tends to increase, the outside profile of the nacelles is to be increasingly short and fine, which tends to reduce the volume of the zone that is provided for the thrust reversal device.

The patent application WO 2007/003749 proposes a solution that consists in providing doors in the rear part of the nacelle. This solution makes possible a better acoustic treatment of the inside surfaces but leads to increasing the thickness of the nacelle in the rear part and the aerodynamic drag.

Also, the purpose of this invention is to compensate for the drawbacks of the prior art by proposing an aircraft nacelle that incorporates a thrust reversal device of a simple design, able to optimize the acoustic treatment, with a reduced impact on the aerodynamic performances of the nacelle.

For this purpose, the invention has as its object an aircraft nacelle in which a power plant with an outside surface is arranged, whereby said nacelle comprises an inside wall that, with the outside surface of the power plant, delimits a secondary annular pipe, at least one moving part so as to create at least one side opening and a thrust reversal device that comprises at least one moving physical obstacle that can occupy a first retracted state in which it does not deflect the stream that is circulating in the secondary pipe and another deployed state in which it at least partially deflects said stream that is circulating in the secondary annular pipe toward said at least one side opening, characterized in that it comprises a ring that is arranged in the secondary pipe, distant from the inside wall of the nacelle and the outside surface of the power plant, comprising, on the one hand, a first series of so-called outside flaps that are able to occupy a first retracted state in which they do not project relative to the ring and a second deployed state in which they project relative to the ring in the direction of the inside wall of the nacelle so as to at least partially deflect the stream that circulates between the ring and the inside wall of the nacelle in the direction of said at least one side opening, and, on the other hand, a second series of so-called inside flaps that can occupy a first retracted state in which they do not project relative to the ring and a second deployed state in which they project relative to the ring in the direction of the outside surface of the power plant so as to at least partially deflect the stream that circulates between the ring and the outside surface of the power plant in the direction of said at least one side opening.

Figures 3A, 3B:
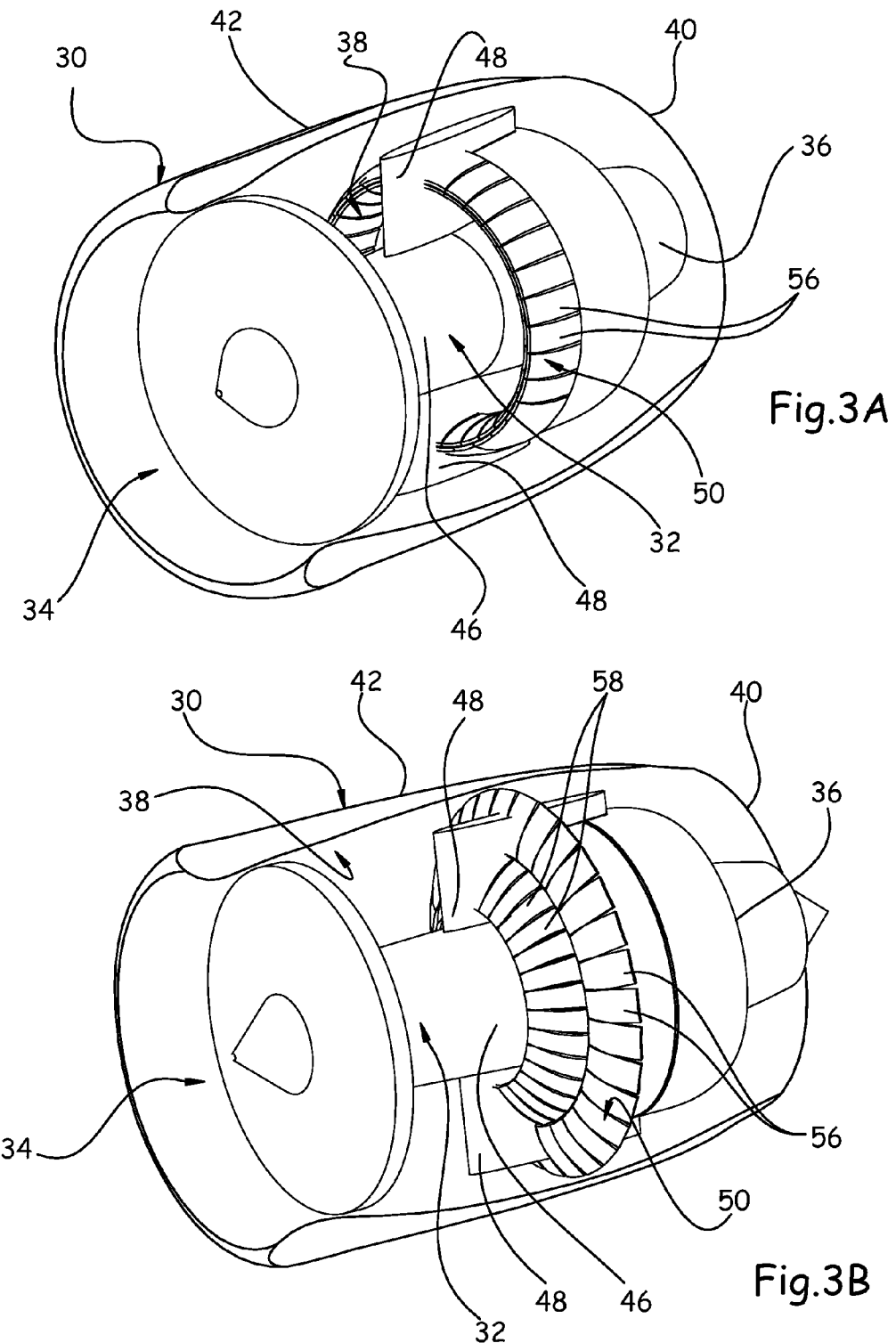
Figure 4:
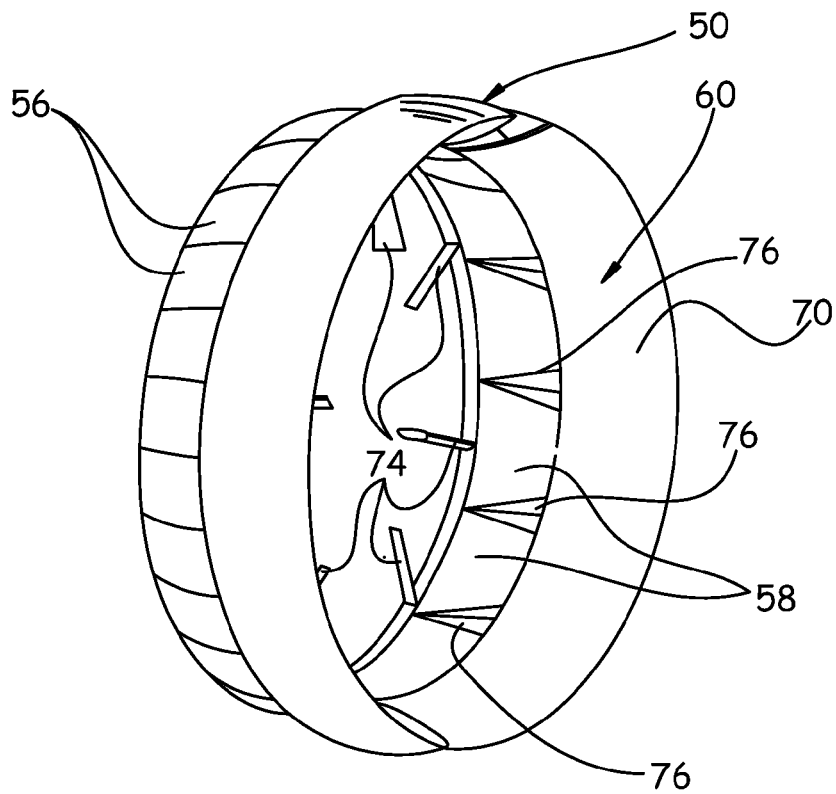
Figure 5:
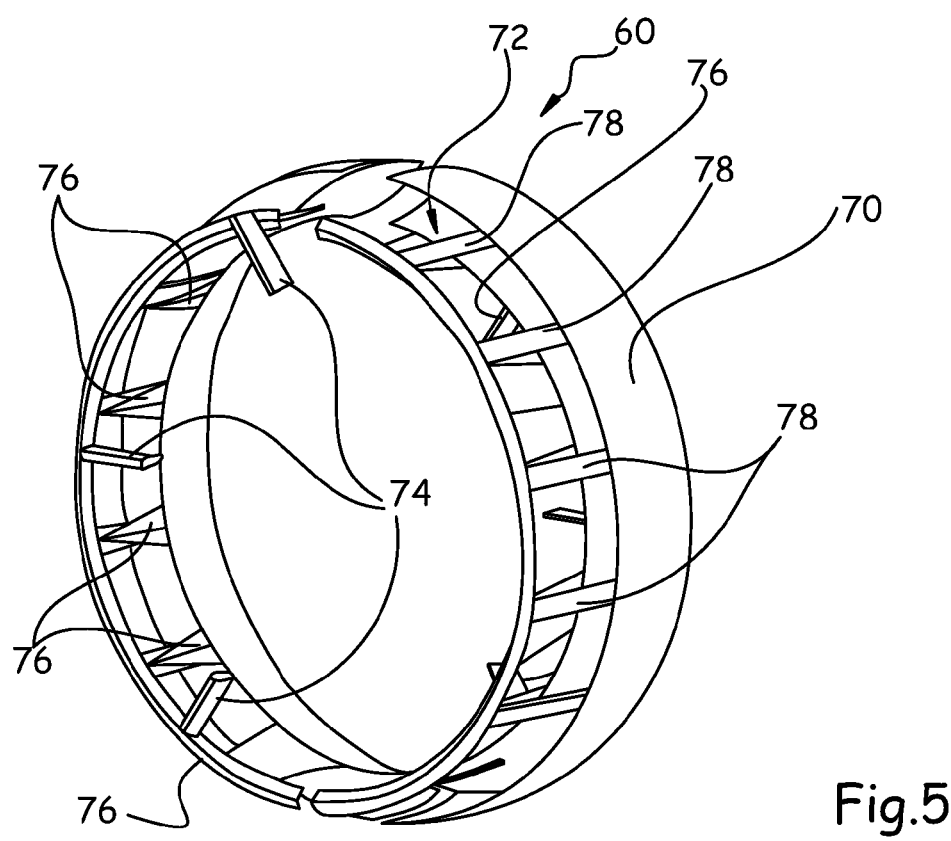
Figure 8:
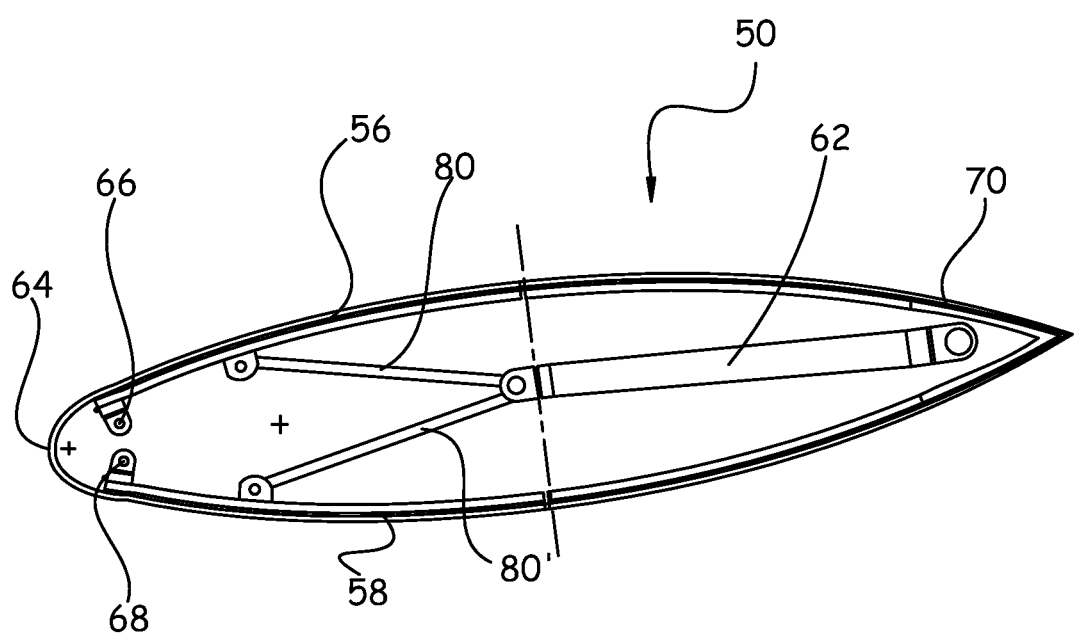

Other characteristics and advantages will emerge from the following description of the invention, a description that is provided only by way of example, relative to the accompanying drawings in which:

FIG. 1 is a longitudinal cutaway of a nacelle that incorporates a thrust reversal system according to a first variant of the prior art, whereby the upper part illustrates the thrust reversal system in the active state and the lower part illustrates the thrust reversal system at rest, FIG. 2A is a longitudinal cutaway of a nacelle that incorporates a thrust reversal system according to another variant of the prior art that illustrates the thrust reversal system at rest, FIG. 2B is a longitudinal cutaway of a nacelle that incorporates a thrust reversal system according to another variant of the prior art that illustrates the thrust reversal system in the active state, FIG. 3A is a diagram that illustrates in perspective a nacelle that incorporates a thrust reversal system according to the invention at rest, FIG. 3B is a diagram that illustrates in perspective a nacelle that incorporates a thrust reversal system according to the invention in the active state, FIG. 4 is a perspective view of a thrust reversal system by itself at rest, FIG. 5 is a perspective view of the chassis of the thrust reversal system according to the invention, FIG. 6A is a cutaway of the thrust reversal system according to the invention at rest, FIG. 6B is a cutaway of the thrust reversal system according to the invention in the active state, FIG. 7 is a perspective view that illustrates in detail the maneuvering means of the flaps of the thrust reversal system according to the invention, and FIG. 8 is a cutaway of the thrust reversal system according to the invention that is equipped with a panel for acoustic treatment.

In the different figures, an aircraft nacelle, in which a power plant, shown schematically at 32, is able to be arranged essentially concentrically, was shown at 30.

At the front, the nacelle 30 comprises an air intake 34 that is divided into a primary pipe that passes through the power plant and empties out via a primary exhaust 36 at the rear of the nacelle and a secondary annular pipe 38 that is provided at the rear of a fan that empties out via a secondary pipe 40. Thus, the thrust of the propulsion unit originates in particular from the ejection of fluid flow leaving the primary and secondary exhausts 36 and 40.

The nacelle 30 comprises a first wall whose outside surface 42 is in contact with the fluid flow that originates outside of the nacelle and a second wall 44 (also called an inside wall of the nacelle), which delimits the secondary annular pipe 38 with the outside surface 46 of the power plant.

Two junctions 48 are generally arranged in the secondary pipe 38, and in said pipe 38, said junctions form partitions that are arranged in a vertical plane, in angular positions that are respectively greater than 12 o'clock and less than 6 o'clock. Thus, the nacelle comprises a reinforced structure in the zone of the vertical median plane. This reinforced structure is also used to serve as an anchoring point to a mast that connects the nacelle to the aircraft, and more particularly the nacelle to the wing of the aircraft.

All of these elements are not presented in more detail because they are known to one skilled in the art, and they can assume different shapes based on the configurations.

According to the invention, the nacelle comprises a ring 50 that is arranged in the secondary pipe 38, distant from the inside wall 44 of the nacelle and the outside surface 46 of the power plant, with a section in the shape of an aircraft wing, namely a leading edge that is rounded at the front in the direction of flow of the streams in the secondary pipe and a trailing edge that is tapered toward the rear.

To enhance the acoustic treatment, the ring 50 preferably comprises a coating for the acoustic treatment that comprises—from the outside to the inside—an acoustically resistive porous layer, at least one alveolar structure, and a reflective or impermeable layer. This characteristic makes it possible to increase the surface area of the nacelle comprising a coating for the acoustic treatment.

The section of the ring that is delimited by its so-called aerodynamic outside surface is adapted so that the aerodynamic disturbances that are generated by the ring 50 are the smallest possible.

According to a significant characteristic of the invention, the nacelle comprises a stationary part and at least one moving part making it possible to generate at least one side opening. Generally, at the rear, the nacelle comprises at least one moving part 52 that can move translationally toward the rear so as to release a side opening 54, as illustrated in FIG. 6B. Guiding means and actuators are provided for ensuring the translation of the moving part 52. These elements are not described further because they are known to one skilled in the art, in particular for the cascade thrust reversal devices.

However, contrary to the latter, the moving part does not comprise any flap, and the inside surface of said moving part extends up to the inside surface of the stationary part that is arranged at the front as illustrated in FIG. 6A. To the extent that no flap is inserted between the inside surface of the stationary part and that of the moving part, the area of the treated surfaces on the acoustic plane is increased relative to the nacelle that incorporates a cascade thrust reversal device.

According to a significant characteristic of the invention, the ring 50 supports at least one moving physical obstacle that can occupy a first retracted state in which it does not deflect the stream that circulates in the secondary pipe 38 and another deployed state in which it at least partially deflects said stream that circulates in the secondary pipe 38 toward said at least one side opening 54.

According to the invention, the ring comprises, on the one hand, a first series of so-called outside flaps 56 that can occupy a first retracted state in which they do not project relative to the aerodynamic surface of the ring and a second deployed state in which they project relative to said surface in the direction of the inside wall 44 of the nacelle so as to at least partially deflect the stream that circulates between the ring 50 and the inside wall 44 of the nacelle in the direction of the side opening(s) 54, and, on the other hand, a second series of so-called inside flap(s) 58 that can occupy a first retracted state in which they do not project relative to the aerodynamic surface of the ring and a second deployed state in which they project relative to said surface in the direction of the outside surface 46 of the power plant so as to at least partially deflect the stream that circulates between the ring 50 and the outside surface 46 of the power plant in the direction of the side opening(s) 54.

The fact of providing two series of flaps makes it possible to limit the space between the flaps when the latter are in deployed position.

The outside and inside flaps 56 and 58 are shown in the retracted state in FIGS. 3A, 4, 6A and 8 and in the deployed state in FIGS. 3B, 6B and 7.

The ring 50 is positioned in the second pipe 38 so that when the flaps 56 and 58 are in the deployed state, the ends of the outside flaps 58 are arranged essentially at the front edge of the moving part(s) 52 that are translationally moved toward the rear.

To the extent that the ring 50 is distant from the inside surface 44 of the nacelle and the outside surface 46 of the power plant, the flaps 56 and 58 have smaller dimensions than the flaps of the cascade thrust reversal devices of the prior art, which tends to reduce the volume that is necessary to the thrust reversal devices and to make them compatible with the new generation power plants.

According to one embodiment, the ring 50 comprises a chassis 60 (seen in detail in FIGS. 5 and 8) that is connected to the rest of the nacelle and/or to the power plant and/or to the junctions 48, with inside and outside flaps 58 and 56 that are articulated relative to the chassis 60, and actuators 62 to ensure the change of state of said flaps 56 and 58.

As illustrated in FIG. 8, the chassis comprises—at the front—a circular shape 64 with a C-shaped cross-section that constitutes the leading edge of the ring 50, whereby joints 66 connect a first end of the C of the circular shape 64 to the outside flaps 56, and whereby joints 68 connect the second end of the C of the circular shape 64 to the inside flaps 58, and—at the rear—a circular shape 70 with a V-shaped cross-section whose point forms the trailing edge of the ring 50, whereby a first branch comes into the extension of the outside flaps 56 and the other branch comes into the extension of the inside flaps 58 when the flaps 56, 58 are in the retracted state, as well as connecting means 72 that connect the circular shapes 64 and 70.

The elements 64, 56, 58, and 70 are arranged in such a way that when the flaps 56 and 58 are in the retracted state, the outside surfaces of said elements 64, 56, 58 and 70 are arranged in the extension of one another so as to limit the disturbances of the stream that circulates in the secondary pipe 38.

According to the embodiment that is illustrated in FIGS. 4 and 5, the chassis 60 is connected to the power plant by means of several crosspieces 74 that more particularly connect the front circular shape 64 to the power plant.

The connecting means 72 comprise a first series of crosspieces 76 that are arranged at the inside surface of the ring and are arranged between the inside flaps 58 and have a V shape for filling in the space between the inside flaps 58 when they are in the retracted state, whereby the latter are not contiguous in this position to the extent that they are contiguous in the deployed state as illustrated in FIG. 3B.

The connecting means 72 comprise a second series of crosspieces 78 that connect the leading edge 64 to the trailing edge 70, inside of the ring, which are arranged under the outside flaps 56 to the extent that the latter are contiguous in the retracted state so as to reduce the spacing between said outside flaps 56 when they are in the deployed state.

The ring 50 comprises a large number of pairs of flaps, each pair comprising an outside flap 56 and an inside flap 58 that are arranged opposite.

For each pair, the ring comprises an actuator 62 that is shown in FIG. 8 and that is housed between the branches of the V-shaped cross-section of the rear circular shape 70, whereby a first end of the actuator is connected to the rear circular shape 70 close to the point, and the second end of the actuator 62 is connected by means of links 80, 80' respectively to the outside flap 56 and to the inside flap 58 at anchoring points that are distant from the joints 66 and 68.

The fact of providing two flaps (an outside flap and an inside flap) for covering the space between the inside wall 44 of the nacelle and the outside surface 46 of the power plant makes it possible to reduce the travel of the actuators 62 and therefore their volumes and their weights.

Advantageously, to improve the acoustic treatment, the surfaces of the flaps and/or chassis 60 can comprise a coating for the acoustic treatment so as to increase the surface area of the coating(s) for the acoustic treatment in contact with the stream that circulates in the secondary pipe 38.

The operating principle of the thrust reversal device according to the invention is as follows.

In the non-activated state of the thrust reversal device as illustrated in FIG. 6A, the stationary and moving parts of the nacelle are contiguous, and the flaps 56 and 58 are in the retracted state. The stream that circulates in the secondary pipe flows on both sides of the ring in the direction of the secondary exhaust 40.

In the activated state of the thrust reversal device, as illustrated in FIG. 6B, the moving part(s) of the nacelle move(s) translationally toward the rear so as to create at least one lateral opening 54. The actuators 62 are then activated so as to cause the deployment of outside flaps 56 and inside flaps 58 so as to at least partially deflect the stream that circulates in the secondary pipe in the direction of the lateral opening(s) 54 for reducing, canceling or reversing the thrust that is produced by said propulsion unit.

The invention claimed is:

1. An aircraft nacelle in which a power plant with an outside surface is arranged, the aircraft nacelle comprising:
   an inside wall that, with the outside surface of the power plant, delimits a bypass duct;
   at least one moving part so as to create at least one lateral opening;
   and a thrust reversal device comprising at least one moving physical obstacle that can occupy a first retracted state in which said obstacle does not deflect the stream that circulates in the bypass duct and another deployed state in which said obstacle at least partially deflects the stream that circulates in the bypass duct toward said at least one lateral opening;
   wherein a ring is arranged in the bypass duct, radially spaced from the inside wall of the nacelle and the outside surface of the power plant, said ring comprising:
   on a first side, a series of outside flaps that can occupy a first retracted state in which the outside flaps do not project relative to the ring and a second deployed state in which the outside flaps do project relative to the ring in the direction of the inside wall of the nacelle so as to at least partially deflect the stream that circulates between the ring and the inside wall of the nacelle in the direction of said at least one lateral opening, and
   on a second side, a series of inside flaps that can occupy a first retracted state, in which the inside flaps do not project relative to the ring and a second deployed state in which the inside flaps do project relative to the ring in the direction of the outside surface of the power plant so as to at least partially deflect the stream that circulates between the ring and the outside surface of the power plant in the direction of said at least one lateral opening.

2. The aircraft nacelle according to claim 1, wherein the ring has a cross-section in the form of an aircraft wing with a leading edge that is rounded toward the front in the direction of flow of the streams in the bypass duct and a trailing edge that is tapered at the rear.

3. The aircraft nacelle according to claim 2, wherein the ring comprises:
   a chassis that may be connected directly to the nacelle and/or to the power plant,
   inside and outside flaps that are hinged relative to the chassis, and
   actuators for ensuring the change of state of said flaps.

4. The aircraft nacelle according to claim 3, wherein at a front, the chassis comprises a circular shape with a C-shaped cross-section that constitutes the leading edge of the ring, joints that connect a first end of the C of the circular shape to the outside flaps, joints that connect the second end of the C of the circular shape to the inside flaps, at a rear a circular shape with a V-shaped cross-section whose point forms the trailing edge of the ring, a first branch that comes into the extension of the outside flaps and the other branch into the extension of the inside flaps when the flaps are in the retracted state, as well as connecting means that connect the circular shapes.

5. The aircraft nacelle according to claim 4, wherein the connecting means comprise a first series of crosspieces that are arranged at the inside surface of the ring and that are arranged between the inside flaps and that have a V shape for filling in the space between the inside flaps when the inside flaps are in the retracted state.

6. The aircraft nacelle according to claim 4, wherein the connecting means comprise a second series of crosspieces that connect the leading edge to the trailing edge inside of the ring and that are arranged under the outside flaps.

7. The aircraft nacelle according to claim 3, wherein the ring comprises a plurality of pairs of flaps, whereby each pair comprises an outside flap and an inside flap that are arranged opposite, and for each pair, an actuator that is housed in the chassis, whereby a first end of the actuator is connected to said chassis, and whereby the second end of the actuator is connected by means of links respectively to the outside flap and to the inside flap.

8. The aircraft nacelle according to claim 3, wherein the surfaces of the flaps and/or the chassis in contact with the stream that circulates in the bypass duct comprise a coating for the acoustic treatment.

9. The aircraft nacelle according to claim 4, wherein the ring comprises a plurality of pairs of flaps, whereby each pair comprises an outside flap and an inside flap that are arranged opposite, and for each pair, an actuator that is housed in the chassis, whereby a first end of the actuator is connected to said chassis, and whereby the second end of the actuator is connected by means of links respectively to the outside flap and to the inside flap.

10. The aircraft nacelle according to claim 5, wherein the ring comprises a plurality of pairs of flaps, whereby each pair comprises an outside flap and an inside flap that are arranged opposite, and for each pair, an actuator that is housed in the chassis, whereby a first end of the actuator is connected to said chassis, and whereby the second end of the actuator is connected by means of links respectively to the outside flap and to the inside flap.

11. The aircraft nacelle according to claim 6, wherein the ring comprises a plurality of pairs of flaps, whereby each pair comprises an outside flap and an inside flap that are arranged opposite, and for each pair, an actuator that is housed in the chassis, whereby a first end of the actuator is connected to said chassis, and whereby the second end of the actuator is connected by means of links respectively to the outside flap and to the inside flap.

12. The aircraft nacelle according to claim 4, wherein the surfaces of the flaps and/or the chassis in contact with the stream that circulates in the secondary pipe comprise a coating for the acoustic treatment.

13. The aircraft nacelle according to claim 5, wherein the surfaces of the flaps and/or the chassis in contact with the stream that circulates in the secondary pipe comprise a coating for the acoustic treatment.

14. The aircraft nacelle according to claim 6, wherein the surfaces of the flaps and/or the chassis in contact with the stream that circulates in the bypass duct comprise a coating for the acoustic treatment.

15. The aircraft nacelle according to claim 7, wherein the surfaces of the flaps and/or the chassis in contact with the stream that circulates in the bypass duct comprise a coating for the acoustic treatment.

16. The aircraft nacelle according to claim 7, wherein there are more than ten pairs of flaps.

17. The aircraft nacelle according to claim 7, wherein there are more than twenty pairs of flaps.

* * * * *